US012601545B2

(12) United States Patent
Ferguson et al.

(10) Patent No.: US 12,601,545 B2
(45) Date of Patent: Apr. 14, 2026

(54) STAND ALONE COPPER BURNER PANEL FOR A METALLURGICAL FURNACE

(71) Applicant: Systems Spray Cooled LLC, Smyrna, TN (US)

(72) Inventors: Scott A. Ferguson, Murfreesboro, TN (US); Troy D. Ward, Franklin, TN (US)

(73) Assignee: Systems Spray Cooled LLC, Smyrna, TN (US)

( * ) Notice: Subject to any disclaimer, the term of this patent is extended or adjusted under 35 U.S.C. 154(b) by 0 days.

(21) Appl. No.: 18/592,431

(22) Filed: Feb. 29, 2024

(65) Prior Publication Data

US 2024/0200874 A1 Jun. 20, 2024

Related U.S. Application Data

(63) Continuation of application No. 18/130,283, filed on Apr. 3, 2023, now Pat. No. 11,946,697, which is a continuation of application No. 16/560,451, filed on Sep. 4, 2019, now Pat. No. 11,619,450.

(51) Int. Cl.
*F27D 1/12* (2006.01)
*F27D 9/00* (2006.01)

(52) U.S. Cl.
CPC ................. *F27D 1/12* (2013.01); *F27D 9/00* (2013.01); *F27D 2009/0016* (2013.01); *F27D 2009/0067* (2013.01)

(58) Field of Classification Search
CPC ...... F27D 1/12; F27D 9/00; F27D 2009/0016; F27D 2009/0067; F23C 5/02; F23D 2214/00; F23D 14/78
See application file for complete search history.

(56) References Cited

U.S. PATENT DOCUMENTS 4,004,789 A 1/1977 Belas et al.
4,437,415 A 3/1984 Spielman
5,561,685 A * 10/1996 Lehr ......................... F27D 1/12 373/76
7,858,018 B2 12/2010 Shver
10,955,135 B2 3/2021 Ferguson et al.
2002/0001332 A1 1/2002 Shver
2006/0091590 A1 5/2006 Arthur et al.
2007/0058689 A1* 3/2007 Rymarchyk, Jr. ...... F27B 3/205 373/76
2007/0267786 A1 11/2007 Higgins et al.
(Continued)

FOREIGN PATENT DOCUMENTS

EP 0044512 B1 * 2/1984
EP 0639750 A1 2/1995
(Continued)

OTHER PUBLICATIONS

U.S. Appl. No. 16/011,618, filed Jun. 18, 2018, entitled: Burner Panel for a Metallurgical Furnace.
(Continued)

*Primary Examiner* — Steven B McAllister
*Assistant Examiner* — Michael James Giordano
(74) *Attorney, Agent, or Firm* — Patterson + Sheridan, LLP

(57) ABSTRACT

One or more embodiments of a burner panel for a metallurgical furnace is described herein. The burner panel has a body having a top surface, a bottom surface, a left surface, a right surface, and a front surface surrounding an interior burner area. A spray-cool system disposed in the interior area. A burner tube at least partially disposed in the interior burner area and extends into the front surface. The burner tube is configured to accept a burner.

18 Claims, 8 Drawing Sheets

(56) References Cited

U.S. PATENT DOCUMENTS

| | | | | |
|---|---|---|---|---|
| 2008/0144692 | A1 | 6/2008 | Lonardi et al. | |
| 2009/0038438 | A1* | 2/2009 | Shver | F27B 3/10 266/216 |
| 2009/0129428 | A1 | 5/2009 | Shver | |
| 2013/0322485 | A1 | 12/2013 | Dorndorf et al. | |
| 2018/0038655 | A1 | 2/2018 | Manasek | |
| 2019/0145708 | A1 | 5/2019 | Boyle et al. | |
| 2019/0219334 | A1 | 7/2019 | Ferguson et al. | |

FOREIGN PATENT DOCUMENTS

| | | | |
|---|---|---|---|
| EP | 3480543 | A2 | 5/2019 |
| JP | 2017116186 | A | 6/2017 |

OTHER PUBLICATIONS

International Search Report and Written Opinion from PCT/US2020/049224 dated Dec. 8, 2020.

Extended European Search Report from EP 20860967.7 dated Jan. 11, 2023.

Office Action from European Patent Application No. 20860967.7 dated Nov. 30, 2023.

Office Action from Mexican Patent Application No. MX/a/2022/000329 dated Feb. 20, 2025, with machine translation.

Office Action from Australian Patent Application No. 2020340981 Dated Sep. 11, 2025.

* cited by examiner

STAND ALONE COPPER BURNER PANEL FOR A METALLURGICAL FURNACE

RELATED APPLICATIONS

This application is a continuation of U.S. patent application Ser. No. 18/130,283, filed Apr. 3, 2023, which is a continuation of U.S. patent application Ser. No. 16/560,451, filed Sep. 4, 2019, now U.S. Pat. No. 11,619,450, the contents of which are incorporated herein by reference in their entireties.

BACKGROUND OF THE DISCLOSURE

Field of the Disclosure

Embodiments of the present disclosure relates generally to a burner panel for a metallurgical furnace, and a metallurgical furnace having the same.

Description of the Related Art

Metallurgical furnaces (e.g., electric arc furnaces, ladle metallurgical furnaces and the like) are used in the processing of molten metal materials. The electric arc furnace heats charged metal in the furnace by means of an electric arc from a graphite electrode and/or one or more oxy-fuel burners. The heating from both the electric current from the electrode passing through the charged metal material and the oxy-fuel burners form a molten bath of metal material. Melting of the metal material also forms slag (a stony waste material).

A metallurgical furnace has number of components, including a roof that is retractable, a hearth that is lined with refractory brick, and a sidewall that sits on top of the hearth. The metallurgical furnace typically rests on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of, for example, the roof and sidewall of the furnace. One cooling method referred to as non-pressurized spray-cooling, sprays a fluid-based coolant (e.g., water) against an external surface of plate that comprises the roof, sidewall or other hot surface of the furnace. For this cooling method, the fluid-based coolant is sprayed from a fluid distribution outlet at atmospheric pressure. As the fluid-based coolant contacts the external surface of the plate, the plate is relieved of heat transferred to the plate from the molten materials within the furnace, thus regulating the temperature of the plate. An evacuation system is used to continually remove spent coolant (i.e., coolant that has contacted the external surface of the plate) from the plate.

The typical oxy-fuel burners and injectors disposed through a sidewall of the furnace are housed of a separate large copper burner panel with openings to house the burner/injector. The burner panels typically have internal high-pressure cooling pipes to withstand the heat of the furnace and potential blowback from the burner itself. The cooling system for the burner panel is plumbed to an external cooling system separate than that of the furnace. Conventional copper burner panels having tubular water cooling have been manufactured for years in varying different shapes. Some nearly flush with the inside diameter of the sidewall others protruding out into the furnace. The conventional burner panels having the tubular water cooling are formed from a large unitary mass of material for heat transfer and cooling purposes.

The intense heat and harsh environment of which the burner panel is exposed to, along with the complex cooling and draining system for the furnace, necessitates periodic maintenance and refurbishment of the burner panels for the electric arc furnace. The burner panels are typically mechanically fixed in place so as to seal openings formed in the sidewall of the furnace. Furthermore, due to the weight, size and complexity of the oxy-fuel burners and the burner panels, it is difficult and expensive to remove, repair and replace the burner panels. Thus, the cost of maintaining the burner panels, coupled with the assembly and disassembly time, can become expensive and labor intensive.

Therefore, there is a need for an improved burner panel, and furnace having the same.

SUMMARY

One or more embodiments of a burner panel for a metallurgical furnace is described herein. The burner panel has a body having a top surface, a bottom surface, a left surface, a right surface, and a front surface defining an interior burner area. A spray-cool system disposed in the interior area. A burner tube at least partially disposed in the interior burner area and extending into the front surface, wherein the burner tube is configured to accept a burner.

In yet another example, a metallurgical furnace having a burner panel is described herein. The metallurgical furnace has a sidewall having a roof disposed thereon. The sidewall has an interior face having a first surface surrounding an interior volume and a second surface facing away from the interior volume. The interior volume has a first spray-cool system and a drain system disposed therein. The interior face has a sidewall burner pocket formed therethrough. A burner panel is disposed in the burner pocket. The burner panel has a body having a top surface, a bottom surface, a left surface, a right surface, and a front surface surrounding an interior burner area. A second spray-cool system disposed in the interior area. A burner tube at least partially disposed in the interior burner area and extending into the front surface, wherein the burner tube is configured to accept a burner.

In yet another example, a method of spray-cooling a burner panel in a metallurgical furnace is described herein. The method starts by coupling a burner panel of a metallurgical furnace to a cooling fluid source. The burner panel has a spray-cool system and a drain disposed therein. The method continues by spraying cooling fluid from the spray-cool system in the burner panel. The method proceeds by collecting the cooling fluid sprayed from the spray-cooled system in the drain of the burner panel.

BRIEF DESCRIPTION OF THE DRAWINGS

So that the way the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present invention is directed to a metallurgical furnace having one or more burner panels therein for melting metal material. The burner panel has one surface that faces an interior portion of the furnace in which metal is melted. The burner panel has a spray-cool system for cooling the burner panel. The burner panel is a spray-cooled metal box with a pass-thru opening to house a copper burner gland, and is configured to sit within a traditional burner panel opening, i.e., burner pocket, in the sidewall of the metallurgical furnace. In one example, the burner panel is formed from copper optionally having an integral carbon steel frame that enables welding of the frame to the sidewall to provide a water-tight seal between the burner panel and the sidewall of the metallurgical furnace. The burner panel includes provisions to house an oxy-fuel burner and/or oxygen injector and/or carbon injector and/or a lime burner. The burner panel is cooled by utilizing a non-pressurized spray-cooling system that sprays a fluid-based coolant, such as water, against an external surface of the burner panel to relieve heat generated by the melting processes ongoing within the furnace. The spray-cool system of the burner panel eliminates the need for a separate independent high-pressure cooling piping system and corresponding drain piping system for cooling the burner panel.

Figure 1:
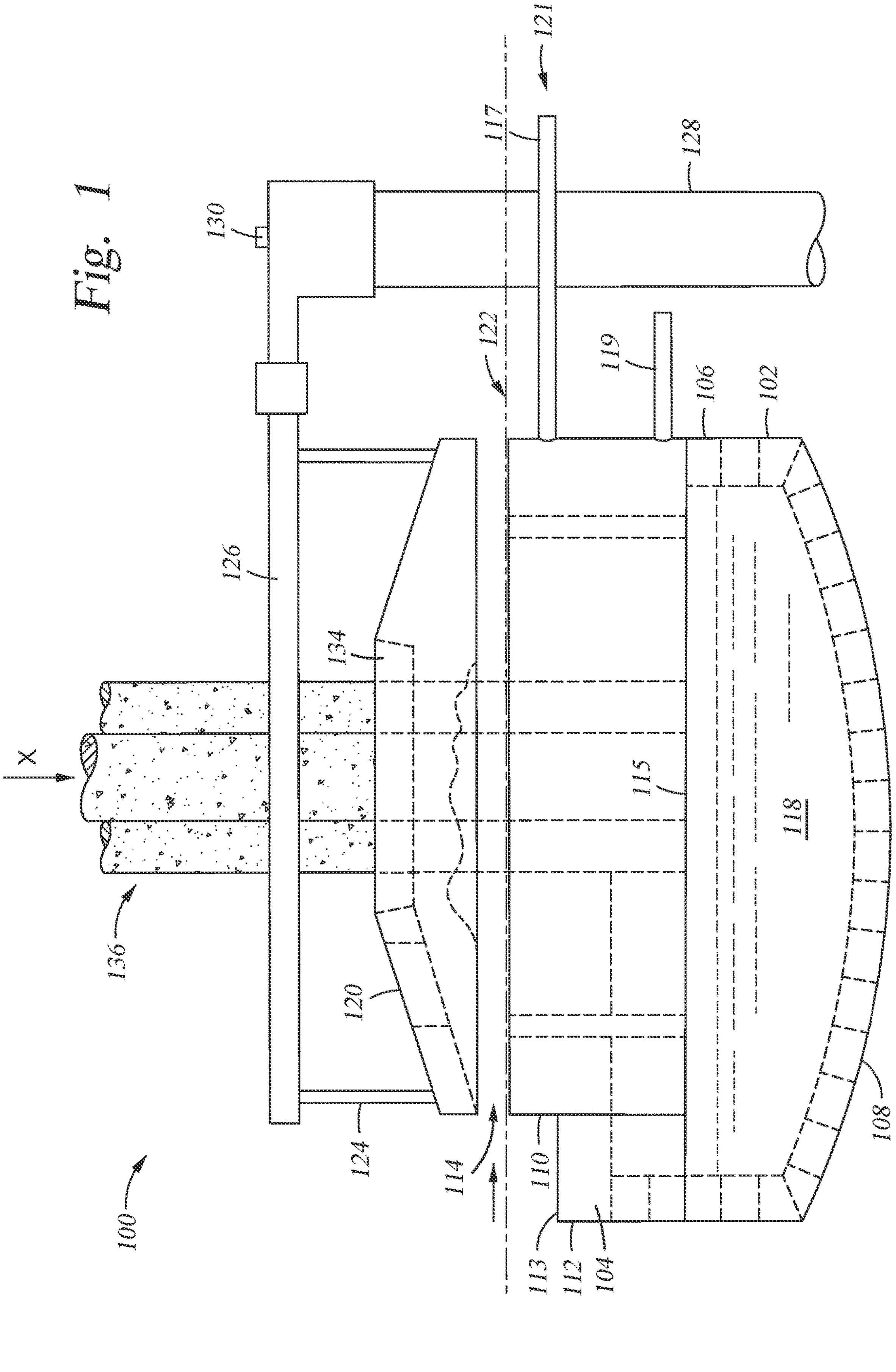
FIG. 1 illustrates an elevational side view of a metallurgical furnace having a spray-cooled roof.

FIG. 1 illustrates an elevational side view of one example of a metallurgical furnace 100. The metallurgical furnace 100 has a body 102 and a roof 120. The roof 120 is supported on a sidewall 110 of the body 102. The body 102 may be generally cylindrical in shape and have an elliptical bottom. The body 102 additionally includes a step-up 104 to the tap side that extends outward from a main cylindrical portion of the body 102. The step-up 104 includes an upper sidewall 112 (which can be consider part of the sidewall 110) and a cover 113.

The body 102, including the step-up 104, has a hearth 106 that is lined with refractory brick 108. Sidewalls 110, 112 are disposed on top of the hearth 106. The sidewall 110 has a top flange 114 and a bottom flange 115. The roof 120 is moveably disposed on the top flange 114 of the sidewall 110. The bottom flange 115 of the sidewall 110 is removably disposed on the hearth 106.

A spray-cooling system 121 is utilized to control the temperature of sidewall 110. The spray-cooling system 121 has an input cooling port 117 for introducing coolant into the sidewall 110 and a drain port 119 for emptying spent coolant from the sidewall 110. Further details of the spray-cooling system 121 are discussed further below.

The sidewall 110 of the body 102 generally surrounds an interior volume 116 (shown in FIG. 2) of the metallurgical furnace 100. The interior volume 116, illustrated in greater detail in FIG. 2, may be loaded or charged with metal, scrap metal, or other meltable material which is to be melted within the hearth 106 of the metallurgical furnace 100 to generate molten material 118.

The metallurgical furnace 100, including the body 102 and the roof 120, is rotatable along a tilt axis 122 about which the metallurgical furnace 100 can tilt. The metallurgical furnace 100 may be tilted in a first direction about the tilt axis 122 toward the slag door (not shown) multiple times during a single batch melting process, sometimes referred to as a "heat", to remove slag. Similarly, the metallurgical furnace 100 may be tilted in a second direction about the tilt axis 122 towards a tap spout (not shown) multiple times during a single batch melting process including one final time to remove the molten material 118.

Roof lift members 124 may be attached at a first end to the roof 120. The roof lift members 124 may by chains, cables, ridged supports, or other suitable mechanisms for supporting the roof 120. The roof lift members 124 may be attached at a second end to one or more mast arms 126. The mast arms 126 extend horizontally and spread outward from a mast support 128. The mast support 128 may be supported by a mast post 130. The mast support 128 may rotate about the mast post 130. Alternately, the mast post 130 may rotate with the mast support 128 for moving the roof lift members 124. In yet other examples, roof lift members 124 may be aerially supported to move the roof 120. In one embodiment, the roof 120 is configured to swing or lift away from the sidewall 110. The roof 120 is lifted away from the sidewall 110 to expose the interior volume 116 of the metallurgical furnace 100 through the top flange 114 of the sidewall 110 for loading material therein.

The roof 120 may be circular in shape. A central opening 134 may be formed through the roof 120. Electrodes 136 extend through the central opening 134 from a position above the roof 120 into the interior volume 116. During operation of the metallurgical furnace 100, the electrodes 136 are lowered through the central opening 134 into the interior volume 116 of the metallurgical furnace 100 to provide electric arc-generated heat to melt the molten material 118. The roof 120 may further include an exhaust port to permit removal of fumes generated within the interior volume 116 of the metallurgical furnace 100 during operation.

Figure 2:
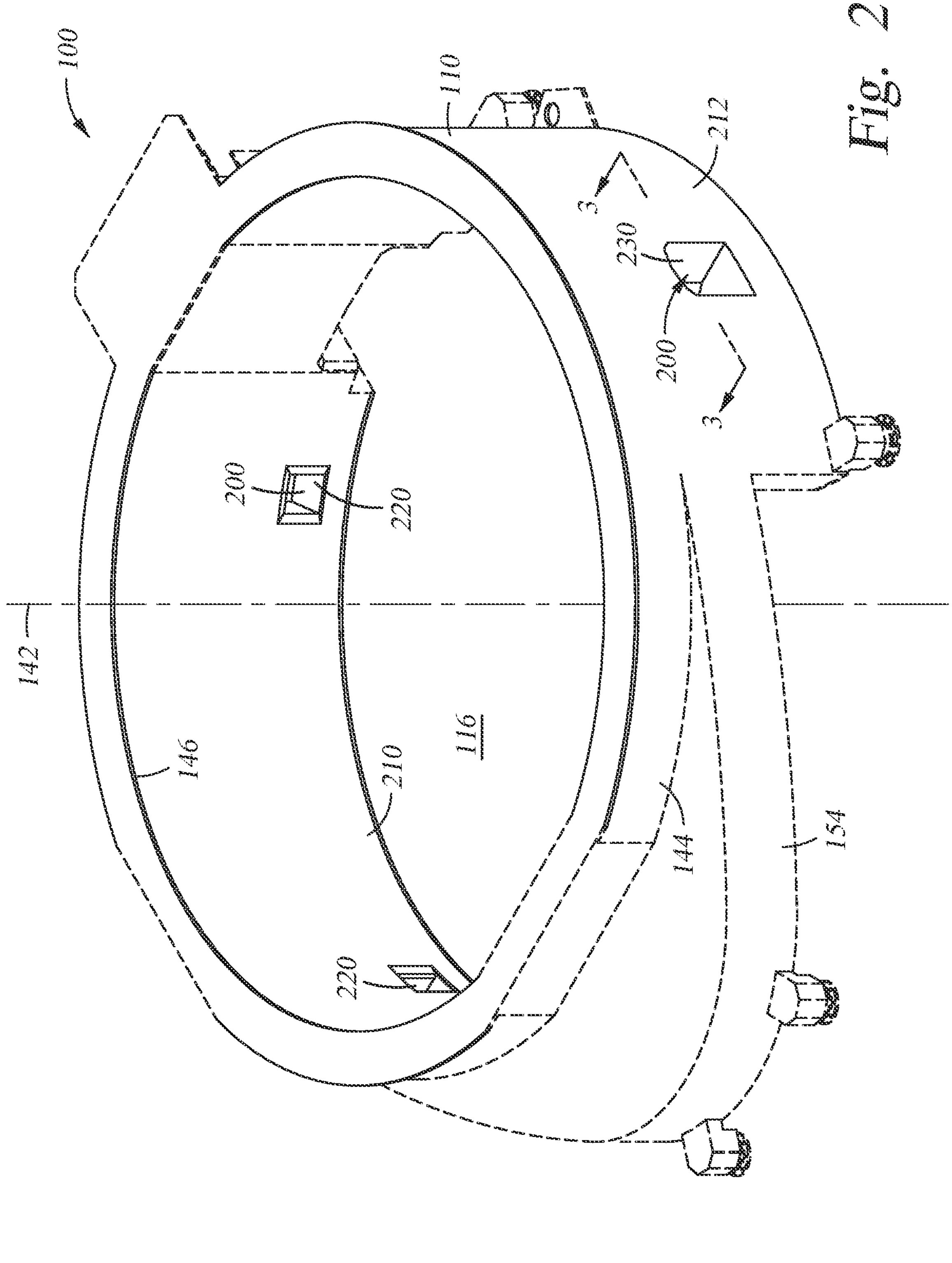
FIG. 2 illustrates a top orthogonal view of the sidewall having a spray-cooled system therein of the metallurgical furnace of FIG. 1.

FIG. 2 illustrates a top perspective view of the metallurgical furnace 100 with the roof 120 removed. Referring to FIGS. 1 and 2, the sidewall 110 of the metallurgical furnace 100 has an outer wall 212 and an inner wall 210. The inner wall 210 includes a plurality of hot plates 146. The outer wall 212 has a plurality of dust covers 144 spaced outward of the hot plate 146 relative to a center axis 142 of the body 102. The side of the hot plate 146 facing away from the outer wall 212 and towards the center axis 142 is exposed to the interior volume 116 of the metallurgical furnace 100. In one example, the hot plate 146 is concentric with the dust covers 144 about the center axis 142 of the body 102.

A plurality of buckstays (not shown) is distributed between the outer wall 212 and the inner wall 210. The buckstays separate the hot plates 146 in the inner wall 210 from the dust covers 144 in the outer wall 212 of the metallurgical furnace 100. A second plurality of short buckstays (not shown) is distributed about a short outer wall 154 of the step-up 104 to the hot plate 146 of the sidewall 110 of the metallurgical furnace 100. The buckstays significantly increase the buckling resistance of the sidewall 110, thereby allowing the roof 120 to be safely supported by the body 102.

Figure 3:
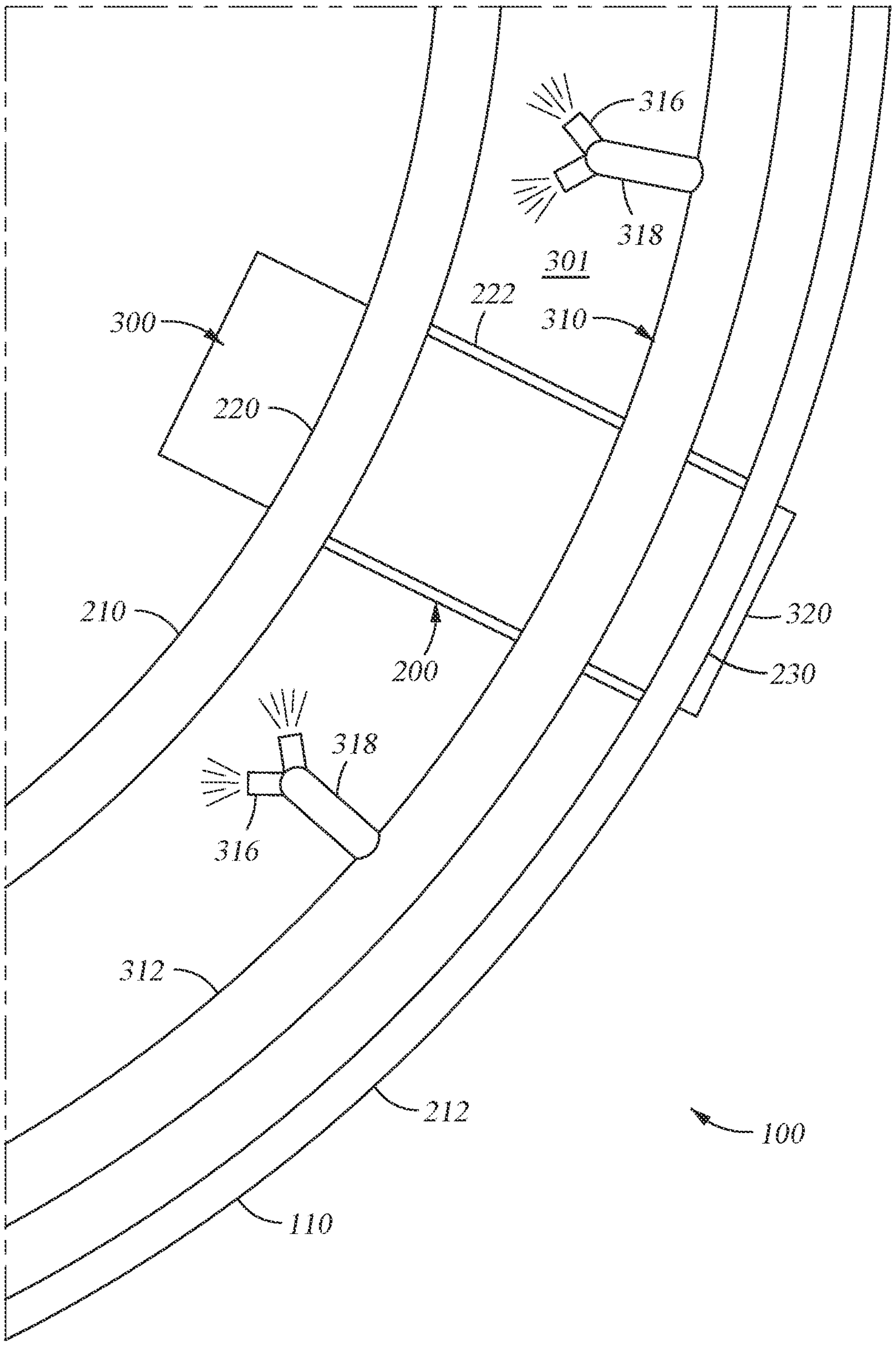
FIG. 3 illustrates a cross-sectional view taken through section line 3-3 of FIG. 2, showing two hollow metal sidewall sections and the spray-cooled system internal thereto.

The inner wall 210 surrounds an interior space 301. Additionally turning to FIG. 3, FIG. 3 illustrates a cross-sectional view taken through section line 3-3 of FIG. 2 and showing a section of the inner wall 210 and the outer wall 212. The inner wall 210 and the outer wall 212 surround an interior space 301. A spray-cooled system 310 is disposed in the interior space 301 of the sidewall 110.

The sidewall 110 additionally has one or more sidewall burner pockets 200. The sidewall burner pockets 200 extend through the sidewall 110 and have an interior opening 220 in the inner wall 210 and an exterior opening 230 in the outer wall 212. The sidewall burner pockets 200 have interior walls 222 extending from the interior opening 220 to the exterior opening 230. The interior walls 222 seal the burner pocket 200 from any fluids interior to the sidewall 110 and encloses the interior of the sidewall 110 from the sidewall burner pocket 200. That is, any fluids interior to the sidewall 110 is prevented from escaping from the interior through the burner pocket 200 by the interior walls 222. The interior opening 220 receives a burner panel 300 which sealing engages to the inner wall 210. The burner panel 300 may additionally seal to the outer wall 212. For example, an exterior portion 320 of the burner panel 300 may be welded to the outer wall 212 or alternatively bolted or packed with material preventing the burner panel 300 from moving in the sidewall burner pocket 200.

The spray-cooled system 310 has a header pipe 312. A plurality of spray bars 318 are fluidly coupled to the header pipe 312. The header 312 configured to be coupled to a coolant water source disposed outside the metallurgical furnace 100. The spray bars 318 have one or more spray nozzles 316. The spray nozzles 316 are configured to spray a prescribed amount of water or other cooling fluid into the interior space 301 for cooling the sidewall 110 during furnace operations. The interior walls 222 of the burner pocket 200 prevent the cooling water sprayed from the spray-cooled system 310 into the interior space 301 of the sidewall 110 from leaking or entering into the burner pocket 200. Likewise, the burner panel 300 is shielded by the interior walls 222 of the burner pocket 200 from the cooling water sprayed into the interior space 301 of the sidewall 110 by the spray-cooled system 310.

Figure 4:
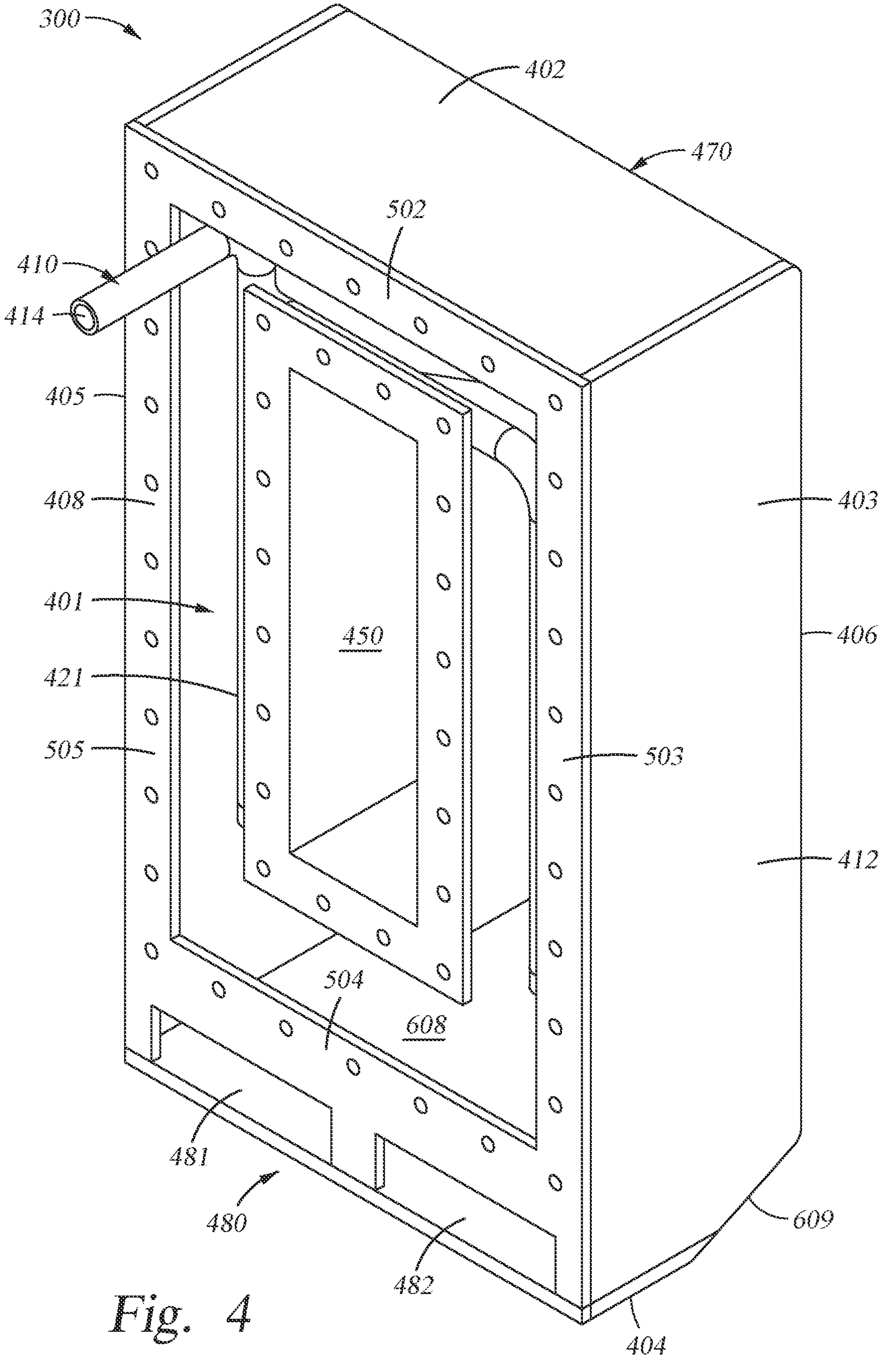
FIG. 4 illustrates a top orthogonal view of the burner panel suitable for the sidewall of the metallurgical furnace of FIG. 2.
Figure 5A:
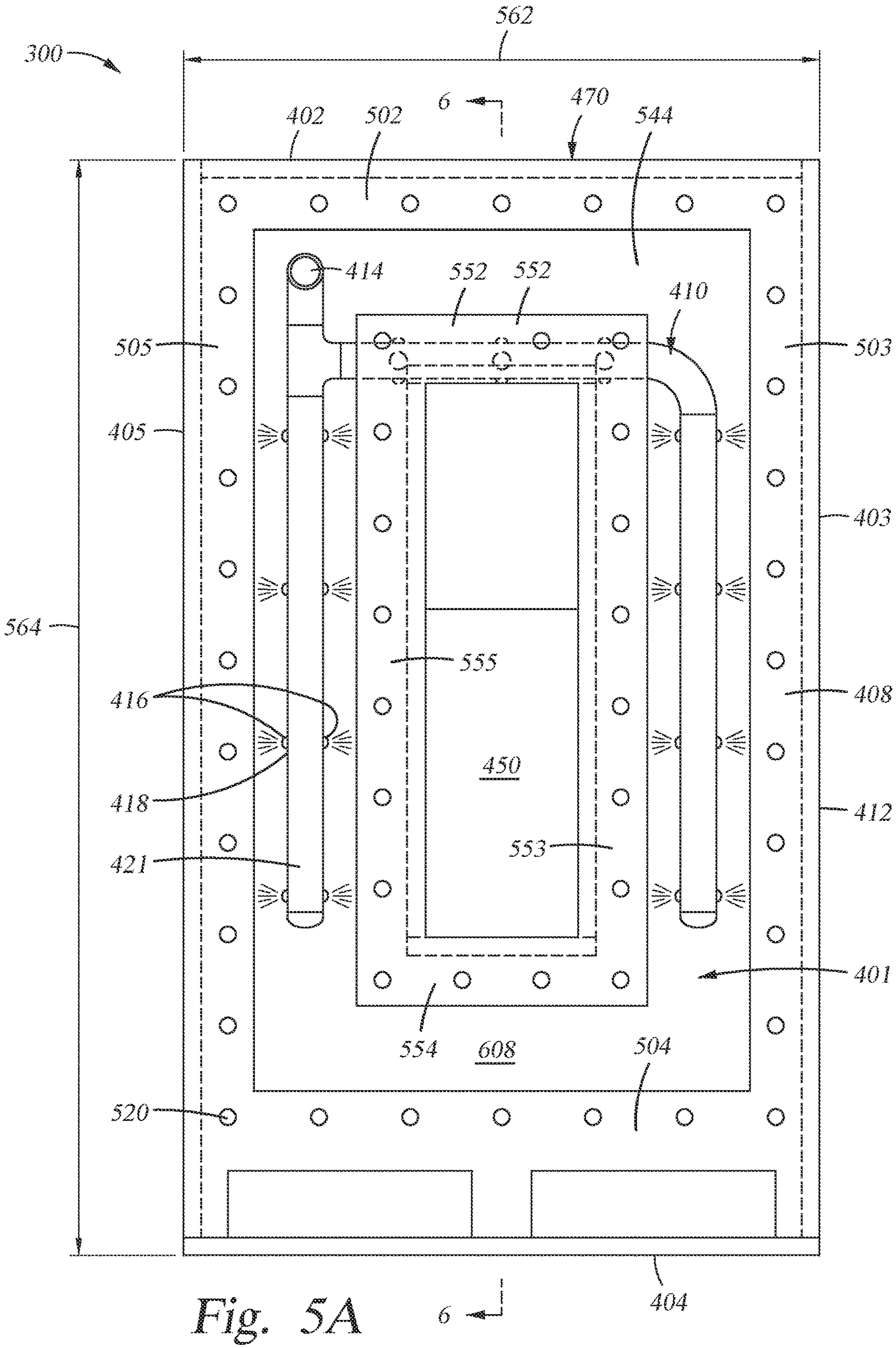
FIG. 5A illustrates a rear plan view of the burner panel of FIG. 4.
Figure 5B:
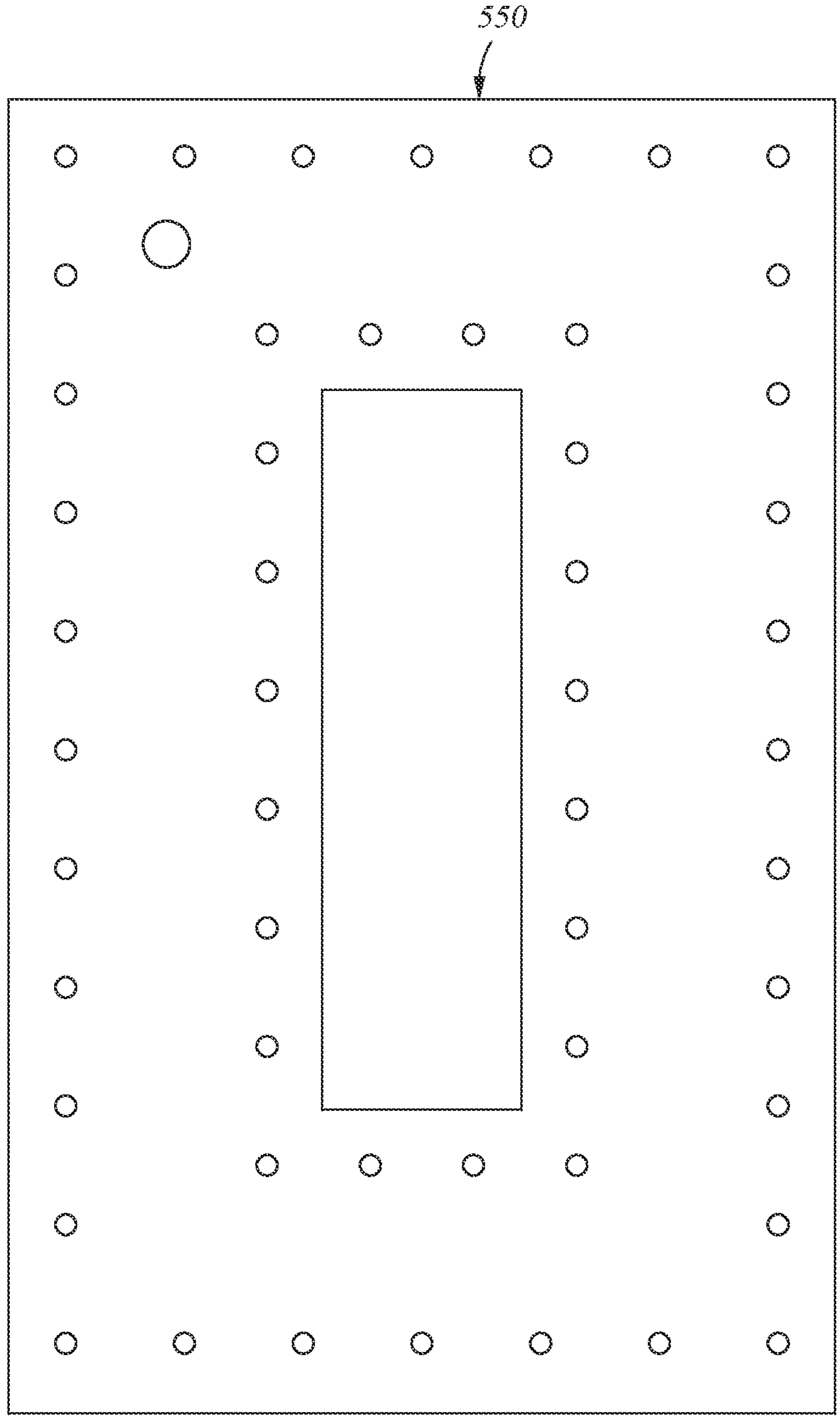
FIG. 5B illustrates a plan view of a dust cover for the burner panel of FIG. 5A.
Figure 6:
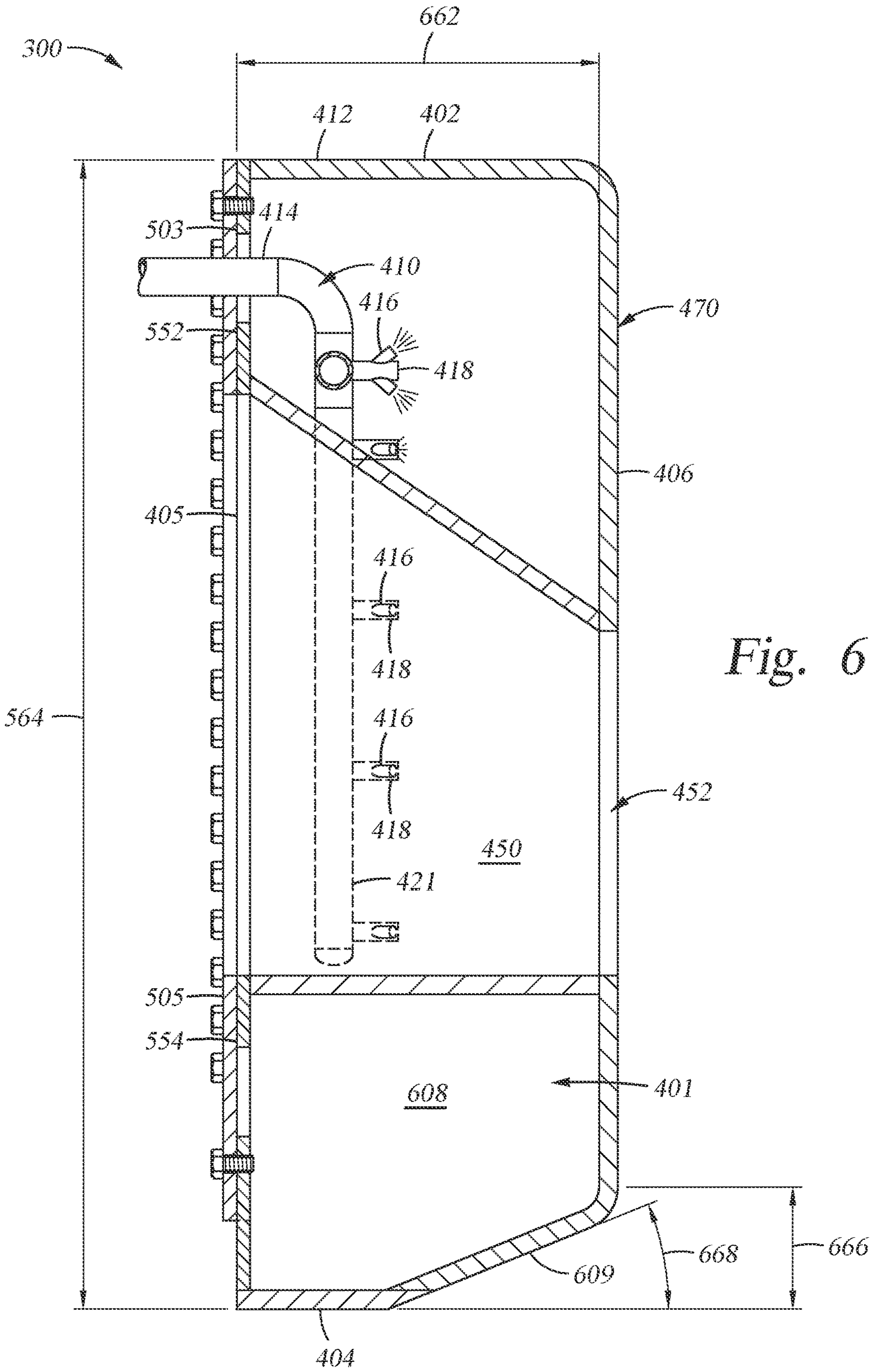
FIG. 6 illustrates a side cross-sectional view of the burner panel of FIG. 4.

FIGS. 4, 5A, 5B and 6 are to the burner panel 300 and will be discussed together. FIG. 4 illustrates a top orthogonal view of the burner panel 300 suitable to engage with the sidewall 110 of the metallurgical furnace 100 shown in FIG. 2. FIG. 5A illustrates a rear plan view of the burner panel of FIG. 4. FIG. 5B illustrates a dust cover for the rear of the burner panel in FIG. 5A. FIG. 6 illustrates a side cross-sectional view of the burner panel of FIG. 4. The burner panel 300 has a body 470. The body 470 is sized to closely fit in the burner pocket 200. The body 470 has a top surface 402, a bottom surface 404, a front face 406, a back face 408, a right side 405 and a left side 403. In some examples the back surface 408 and/or the front surface 406 may extend beyond the burner pocket 200. That is the back surface 408 and/or the front surface 406 may extend beyond the sidewall 110. The top surface 402, the bottom surface 404, the front face 406, the back face 408, the right side 405 and the left side 403 surround and define an interior burner area 401, i.e., the hollow area inside the burner panel 300. A burner tube 450 and a spray-cooled system 410 are disposed, at least partially, in the interior burner area 401.

An exterior portion 412 is defined along the outer surface of the body 470 opposite to the interior burner area 401. The exterior portion 412 of the body 470 may be in contact with, or coupled to, the burner pocket 200. The body 470 may optionally include a plurality of slag retaining depressions disposed on the front surface 406 along the exterior portion 412 which is exposed to the interior volume 116 of the metallurgical furnace 100. The depressions aid in retaining slag on the front surface 406 of the body 470.

The body 470 may be formed from copper, steel, or other suitable thermally conductive material. In one example, the body 470 is formed from copper. The body 470 of the burner panel 300 may optionally have a mounting flange (not shown) surrounding the body 470 on the exterior portion 412. The mounting flange is configured to couple the burner panel 300 to the sidewall 110. The mounting flange may be formed from steel or other suitable material. In one embodiment, the mounting flange is formed from steel and cast into the copper body 470. Alternately, the burner panel 300 is coupled to the sidewall without the use of the flange such as through, brazing, welding, slip or friction fit, or other suitable techniques.

The burner tube 450 is disposed through the front surface 406. The burner tube 450 may extend through the back surface 408. Alternately, the burner tube 450 may form a portion of the back surface 408. In other alternatives, the burner tube 450 may seal against the back surface 408 and front surface 406 in the interior burner area 401. The burner tube 450 provides an opening 452 from the back surface 408 to the front surface 406. The burner tube 450 is configured to accept a burner which extends through the opening 452 of the burner panel 300 into the interior volume 116 of the metallurgical furnace 100. The burner tube 450 seals the interior burner area 401 from the burner such that the cooling fluid does not enter into the burner tube 450 and contact the burner.

The top surface 402, the bottom surface 404, the right side 405 and the left side 403 (side surfaces) of the body 470 may be formed from a single continuous mass of material and formed, such as in a break, to form the four separate surfaces. Alternately, top surface 402, the bottom surface 404, the right side 405 and the left side 403 may be formed from separate plates, or sheets, which are secured together, such as brazing or welding, to form the four separate surfaces. Similarly, the back surface 408 and front surface 406 may be fastened to or welded to a respective side surface, such as left side 403. In other embodiments, the entire body 470, including the front surface 406, the top surface 402, the bottom surface 404, the right side 405 and the left side 403, may be formed by casting, for example using copper, into a single continuous mass of material.

Additionally or alternately, the back surface 408 and/or front surface 406 may be made from the same sheet of material forming a respective side surface, such as top surface 402. The surfaces may form flanges to support or form the back surface 408. For example as illustrated in FIG. 5A, the top surface 402 may be bent to form a top flange 502, the left side 403 may be bent to form a left flange 503, the bottom surface 404 may be bent to form a bottom flange 504, and the right side 405 may be bent to form a right flange 505, all along the back surface 408. In one example, the flanges extend from the side surfaces inward toward the burner tube 450. In another example, the flanges extend outward from the side surfaces away from the burner tube 450. In the example where the flanges extend outward from the body 470, the flange may abut the sidewall 110 of the metallurgical furnace 100 and aid holding the burner panel 300 in the burner pocket 200. Each flange may optionally be welded to a respective side surface and/or an adjoining flange.

Similarly, the burner tube 450 has a plurality of flanges on the back surface 408. For example, a top flange 552, a left flange 553, a bottom flange 554, and a right flange 555 are coupled to the burner tube 450. The flanges 552, 553, 554, 555 all extend outward from the burner tube 450 toward the side surfaces of the body 470. Each flange may optionally be welded to a respective side surface and/or an adjoining flange.

An opening 544 is disposed between the flanges 552, 553, 554, 555 on the burner tube and the flanges 502, 503, 504, 505. The flanges 552, 553, 554, 555 on the burner tube and the flanges 502, 503, 504, 505 on the side surfaces may have a plurality of fasteners 520. The fasteners 520 may be holes, threaded holes, studs or other. As shown in FIG. 5B and in FIG. 6, the back surface 408 may include a dust cover 550, overlaying the flanges of the side surfaces and the burner tube 450. The dust cover 550 may utilize the fasteners 520 to secure the dust cover 550 to the side surfaces and the burner tube 450 for covering the opening 544.

The spray-cooled system 410 is disposed in the interior burner area 401. That is, the spray-cooled system 410 is contained within the body 470, outside the burner tube 450 and enclosed by the dust cover 550. The spray-cooled system 410 may operate independently of the spray-cooled system 310 disposed in the sidewall 110. The spray-cooled system 410 is similarly configured to spray-cooled system 310 having a header 421, spray bars 418 and spray nozzles 416. The header 421 of the spray-cooled system 410 may be fluidly coupled to a water or coolant providing system such as a coolant water source. The spray nozzles 416 of the spray-cooled system 410 spray coolant on the interior burner area 401 of the body 470 for providing cooling of the body 470 and the burner tube 450. In one example, the coolant water source fluidly coupled to spray-cooled system 410 is also fluidly coupled to the spray-cooled system 310. A valve (not shown) may operate either manually or by a controller to provide water or other coolant through the plumbing to the spray-cooled system 410. In another example, the coolant providing system fluidly coupled to spray-cooled system 410 is independent of the spray-cooled system 310. In this manner, the spray cool system 410 operates independently of other cooling systems for cooling the burner panel 300 such that different amounts of coolant may be provided to the respective spray-cool systems 310, 410.

The burner panel 300, inclusive of the dust cover 550, prevents the spent coolant sprayed by the spray-cool system 410 from leaving the interior burner area 401 of the burner panel where the spray-cooled system 410 is contained. The burner panel 300 has a drain 480 on or along the back surface 408 for removing spent coolant from the interior burner area 401 of the burner panel. A gutter 608 is configured to collect spent coolant sprayed by the spray-cooled system 410 for cooling the burner panel 300. The bottom surface 404 may be angled 668 or have other features 609 which direct the spent coolant from the gutter 608 to the drain 480. The drain 480 may be formed from one or more openings in the back surface 408, such as a first opening 481 and a second opening 482. Alternately, the opening 482 for the drain 480 may be on the left side surface 403 or right side surface 405 and adjacent to the back surface 408. The openings 481, 482, may be rectangular or oblong shaped and extend the length of the back surface 408. Alternately, the drain 480 may be configured to accept a pipe, i.e., have a round shape, by threading, welding, utilizing a hose fitting, or other fluidly tight coupling, for removing the spent coolant. The drain 480 may be fluidly coupled to the drain port 119 for emptying spent coolant from the sidewall 110. Alternately, drain 480 may be fluidly independent of the drain port 119 and coupled to a pump or siphon for emptying spent coolant from the burner panel 300.

In one example, the spray-cooled system 410 for cooling the burner panel 300 is independent from the sidewall spray system 310. A valve or separate source line may provide coolant to the spray-cooled system 410 for cooling the burner panel 300 is independent from the sidewall spray system 310. In another example, the spray-cool system is supplied from and drained back into the sidewall 110 via hose connections. This design makes it easier to install and remove compared to other conventional designs for burner panels.

Figure 7:
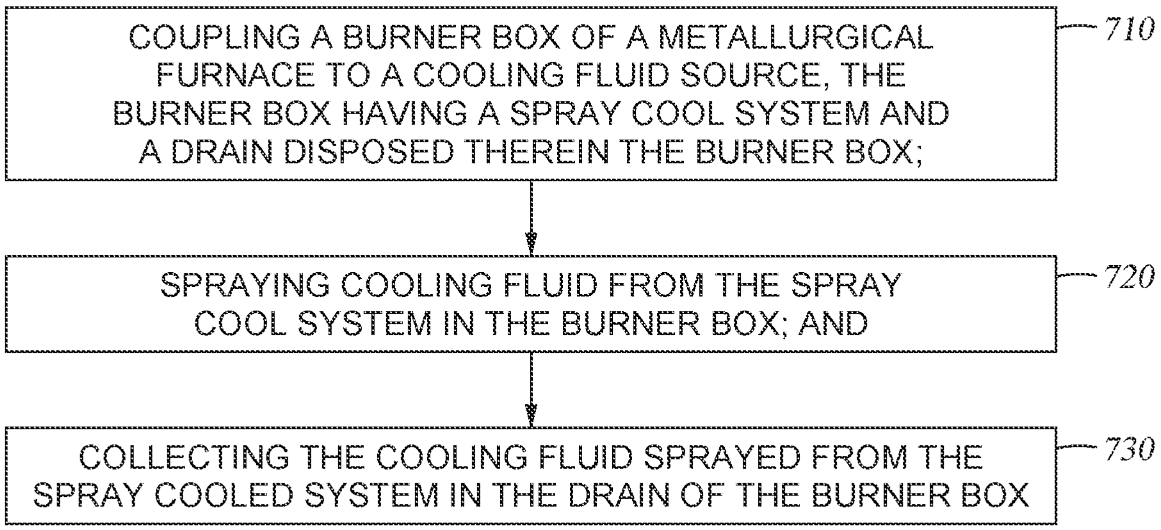
FIG. 7 illustrates a flow diagram for a method for cooling a burner panel of a metallurgical furnace with a spray-cool system.

FIG. 7 illustrates a flow diagram for a method 700 for cooling a burner panel 300 of a metallurgical furnace 100 with a spray-cool system 410. The method 700 begins at operation 710 where a burner panel of a metallurgical furnace is coupled to a coolant providing system. The burner panel has a spray-cool system and a drain. The spray-cool system 410 of the burner panel 300 may optionally be coupled to the spray-cool system 310 of the metallurgical furnace 100. A valve, actuator, or other fluid control device may separately control the spray-cool system 310 of the metallurgical furnace 100 and the spray-cool system 410 of the burner panel 300 such that the two spray-cool systems 310, 410 may operate independently. In one example, the spray-cool system 410 of the burner panel 300 is activated while the spray-cool system 310 in the sidewall, or roof, of the metallurgical furnace 100 is inactive.

At operation 720, cooling fluid is sprayed from the spray-cool system 410 into the burner panel 300. The spraying of the cooling fluid may be activated by a controller controlling a valve between the spray-cool system 410 and the source of the cooing fluid. Nozzles disposed inside the burner panel 300 direct the coolant at the interior surfaces of the burner panel including, the front surface and the burner tube.

At operation 730, the cooling fluid sprayed by the spray-cooled system is collected in the drain of the burner panel. The spent coolant is gravity or vacuum fed into the drain of the burner panel. The drain may be coupled to a common drainage system of the metallurgical furnace for removing spent coolant from the burner panel 300. The drain may gravity feed the common drainage system or pump or other techniques. Alternately, the drain may have a separate drainage system from those present in the metallurgical furnace. The drain removes the spent coolant from the burner panel 300 to be recycled, chilled, or repurposed.

Advantageously, the burner panel can replace conventional burner panels while offering more effective spray-cooling. The burner panel utilizes substantially less material in the construction thereof, thus reducing costs and the overall weight of the burner panel. Existing plumbing for the conventional burner panel can be repurposed to provide the cooling fluid for spraying and draining the spent fluid away from the burner panel for improved thermal performance and reduced water usage without the need for extensive new pipe-work. The spray-cooled burner panel, having the integrated spray-cool system, additionally provides a quicker change-out for existing burner panels.

While the foregoing is directed to embodiments of the present disclosure, other and further embodiments may be devised without departing from the basic scope thereof, and the scope thereof is determined by the claims that follow.

What is claimed is:

1. A method operating a metallurgical furnace having a burner panel, the method comprising:

melting material in an interior volume of the metallurgical furnace, the interior volume surrounded by a sidewall that includes a burner panel disposed in sidewall burner pocket, the burner panel having a body that includes an exterior portion and an interior burner area, the exterior portion of the body exposed to the interior volume of the metallurgical furnace, the body having an opening, a burner tube coupled to the opening and exposed to the interior volume of the metallurgical furnace, a burner disposed through a burner tube, the burner tube isolating the burner from the interior burner area of the burner panel; and spraying cooling fluid from a first spray-cool system on the interior burner area of the burner panel that is isolated from the burner while melting the material with the burner.

2. The method of claim 1, wherein spraying cooling fluid further comprises:

spraying cooling fluid from a first plurality of nozzles located in the interior burner area.

3. The method of claim 2 further comprising:

draining the sprayed cooling fluid by gravity from the interior burner area.

4. The method of claim 2, wherein spraying cooling fluid further comprises:

shielding the cooling fluid sprayed from the first plurality of nozzles located in the interior burner area from an inner volume of the sidewall.

5. The method of claim 1, wherein spraying cooling fluid further comprises:

spraying cooling fluid from a first plurality of nozzles located in the interior burner area, the first plurality of nozzles connected to the first spray-cool system.

6. The method of claim 5 further comprising:

spraying cooling fluid from a second plurality of nozzles located in an inner volume of the sidewall.

7. The method of claim 6, wherein the second plurality of nozzles spraying cooling are coupled to a second spray-cool system.

8. The method of claim 7 further comprising:

preventing cooling fluid from the first spray-cool system from entering the inner volume of the sidewall; and preventing cooling fluid from the second spray-cool system from entering the interior burner area of the burner panel.

9. The method of claim 7 further comprising:

controlling an amount of cooling fluid provided from the first spray-cool system independently from an amount of cooling fluid provided from the second spray-cool system.

10. The method of claim 1, wherein melting the material in the interior volume of the metallurgical furnace further comprises:

arc-generating heat.

11. The method of claim 1 further comprising:

prior to melting material in the interior volume of the metallurgical furnace, replacing a non-spray cool burner panel with the burner panel.

12. A method operating a metallurgical furnace having a burner panel, the method comprising:

melting material in an interior volume of the metallurgical furnace, the interior volume surrounded by a sidewall that includes a burner panel disposed in sidewall burner pocket, the burner panel having a body separating an interior portion of the burner panel from the interior volume of the metallurgical furnace, the burner panel having a burner disposed through a burner tube, the burner tube isolating the burner from the interior portion of the burner panel;

spraying cooling fluid from a first spray-cool system on the interior portion that is isolated from the burner by the burner tube of the burner panel while melting the material; and spraying cooling fluid from a second spray-cool system on an inner volume of the sidewall.

13. The method of claim 12 further comprising:

preventing cooling fluid from the first spray-cool system from entering the inner volume of the sidewall or the burner tube; and preventing cooling fluid from the second spray-cool system from entering the interior portion of the burner panel.

14. The method of claim 12 further comprising:

controlling an amount of cooling fluid provided from the first spray-cool system independently from an amount of cooling fluid provided from the second spray-cool system.

15. The method of claim 12, wherein melting the material in the interior volume of the metallurgical furnace further comprises:

arc-generating heat.

16. The method of claim 12, wherein spraying cooling fluid from the first spray-cool system further comprises:

spraying coolant from a first plurality of nozzles located in the interior burner area of the burner panel.

17. The method of claim 12, wherein spraying cooling fluid from the second spray-cool system further comprises:

spraying cooling fluid from a second plurality of nozzles located in the inner volume of the sidewall.

18. A method operating a metallurgical furnace having a burner panel, the method comprising:

melting material in an interior volume of the metallurgical furnace, the interior volume surrounded by a sidewall that includes a burner panel disposed in sidewall burner pocket, the burner panel having a body separating an interior burner portion of the burner panel from the interior volume of the metallurgical furnace, the burner panel having a burner disposed through a burner tube, the burner tube isolating the burner from the interior burner portion of the burner panel;

spraying cooling fluid from a first spray-cool system the interior burner portion of the burner panel isolated from the burner by the burner tube while melting the material; and preventing cooling fluid from the first spray-cool system from entering the burner tube.

* * * * *